P. KAEMMERER.
PHOTOGRAPHIC CHANGE BOX.
APPLICATION FILED JUNE 8, 1906.
926,495.
Patented June 29, 1909.
2 SHEETS—SHEET 1.
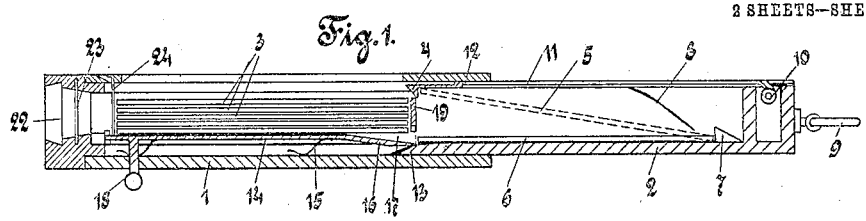
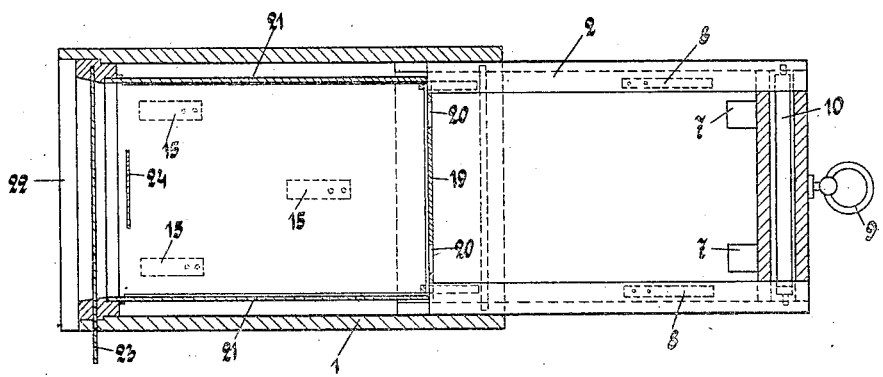
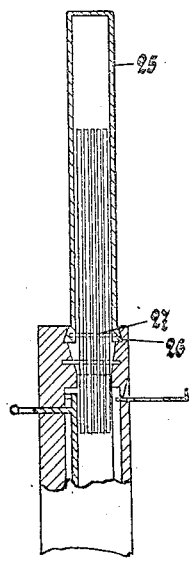

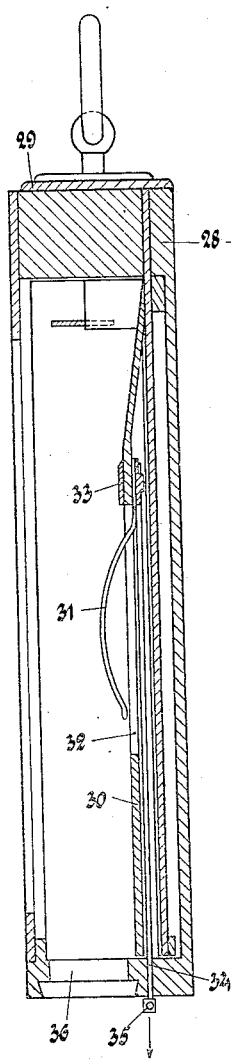
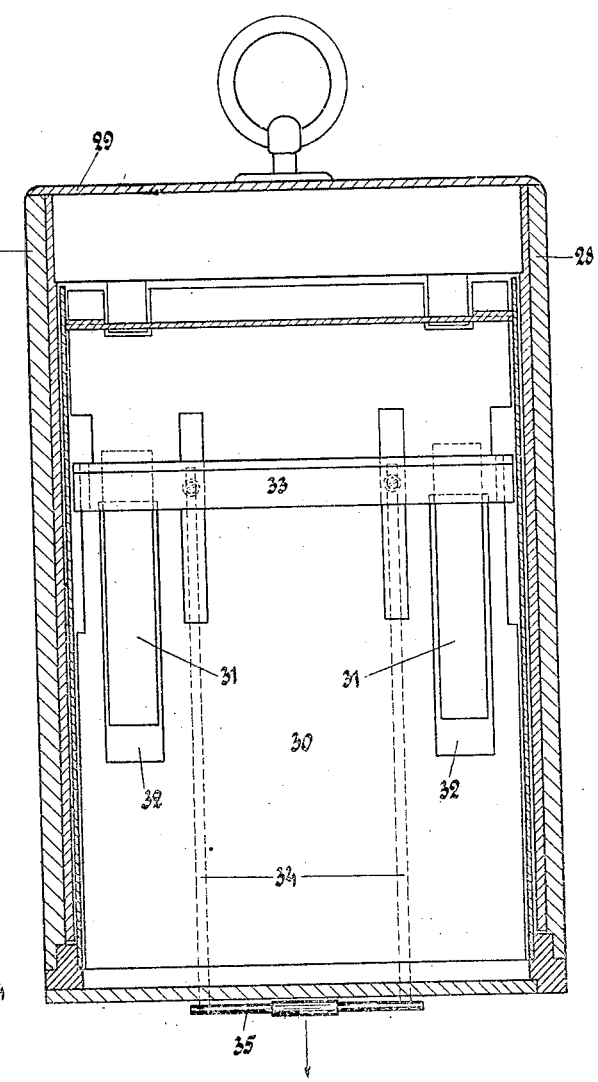

UNITED STATES PATENT OFFICE.

PAUL KAEMMERER, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

PHOTOGRAPHIC CHANGE-BOX.

No. 926,495.  Specification of Letters Patent.  Patented June 29, 1909.

Application filed June 8, 1906. Serial No. 320,695.

*To all whom it may concern:*

Be it known that I, PAUL KAEMMERER, a citizen of the German Empire, and resident of Steglitz, near Berlin, Germany, engineer, have invented certain new and useful Improvements in Photographic Change-Boxes, of which the following is a specification.

This invention relates to an improved photographic change-box adapted to be charged and emptied without difficulty in daylight. For this purpose the box is provided with a closable charging-aperture, and contains a rigid frame which is adapted to laterally inclose the plate and which is provided, at the end adjacent to the charging-aperture, with an aperture for the passage of the plate.

The invention is illustrated in the annexed drawing, in which—

Figure 1 is a longitudinal section through one form of the improved change-box, and Fig. 2 a plan-view partly in section; Fig. 3 is a sectional-view illustrating the manner in which the change-box is charged, and Figs. 4 and 5 are sections illustrating a second embodiment of the invention.

Referring to Figs. 1 to 3, the reference-numeral 1 represents the box, and 2 the change-slide. 3 represents a pile of sensitized plates.

At the front part of the change-slide 2 abutments 4 are provided, the purpose of which is to remove the uppermost plate each time the slide is withdrawn from the box. The plate withdrawn by this means assumes the position indicated by dotted lines 5 and then the position 6 indicated by full lines. The back of the slide is provided with projections 7, against which the plate withdrawn abuts. Two springs 8 arranged within the slide serve to press the withdrawn plate against the back of the said slide. 9 is the handle of the slide and 10 a spring-actuated roller connected with a screen 11, one end of which is attached at 12 to the upper frame of the box 1. The back of the slide is beveled at 13 to facilitate the passage thereof underneath springs 15 when the slide is inserted into the box. 14 is a plate for the support of the photographic plates 3. The springs 15 abut against the plate 14 and the latter is downwardly bent at 16 in such a manner that a triangular space 17, with its open end facing the open end of the box 1, is left free between the plate 14 and the undermost plate 3.

18 is a stud which is fixed to the plate 14 and extends through an aperture in the wall of the box. The latter contains a rigid frame which comprises a part 19 adjacent to the discharging-aperture of the box. The part 19 is provided with apertures 20 for the passage of the projections 7 already referred to. The lateral walls of the rigid frame are indicated by the numeral 21. Opposite the discharging-aperture the box is provided with a charging-aperture 22 normally closed by means of a slide-shutter 23. A short slide 24 adjacent to the shutter 23 serves as an abutment for the plates 3. The case 25 containing the plates is provided with a frame 26 and slide-shutter 27 to allow of inserting the plates into the change-box without exposure.

The manner in which the change-box is used is as follows:—The open end of the case 25 is inserted into the aperture 22 of the empty change-box so that a light-proof joint is made between the two receptacles by means of the guides adjacent to the said aperture 22. The slide-shutters 27 and 23 are thereupon withdrawn and also the abutment-slide 24. The change-box is then held in such a position that the plates slide by gravity from the case into the box, the plate 14 being drawn back by means of the stud 18 in order to allow the entrance of the photographic plates into the box. The fixed lateral frame-parts 21 guide the photographic plates, and the part 19 limits the movement of the latter. When the plates have entered the change-box the slide-shutters 23 and 24 are closed and the box is ready for use.

The plates are changed in the known manner by successively withdrawing and re-inserting the change-slide, so that plates are successively removed from the front of the pile and conveyed to the back thereof. Screen 11 being unrolled from roller 10 when the change-slide is drawn out of the change-box prevents the light from getting access to the exposed plate contained in the hollow of the change-slide. When the change-slide is thereafter pushed back into the change-box screen 11 is wound up again allowing in this way the exposure of the plates contained within the change-box.

The emptying of the change-box is effected in a manner analogous to the charging thereof.

In the preferred construction illustrated in Figs. 4 and 5, 28 is the change-box and 29 the change-slide. 30 is a supporting-plate provided with springs 31, which are fixed to the rear surface of the plate and extend through slots 32 in the latter. The springs 31 exert a pressure on the package of plates or films from the back side, keeping the same in this way firmly within the box. In order to allow insertion or withdrawing of a package of plates or films, it is necessary to depress the springs 31. In order to allow this slide 33 fixed to rods 34 is movable on the plate 30, and is so arranged that when the slide is withdrawn by means of a handle 35 it depresses the springs 31 into the plane of the plate 30. The temporary depression of the springs allows of inserting photographic plates or films into the change-box or of removing the contents of the latter through the aperture 36, as described with reference to Figs. 1 to 3.

Having now particularly described and ascertained the nature of my said invention and in what manner the same is to be performed, I declare that what I claim is:

1. In a photographic change-box a frame open at the top and bottom and adapted to inclose the plates in the box, said frame being provided at one end with an aperture adapted to receive the plates to be exposed, an aperture in the side wall of the change-box adjacent to the aperture of said frame and provided with a closing device, an aperture at the other end of the change-box, and a slide guided in said last named aperture of the box adapted to successively move the plates with the exclusion of light.

2. In a photographic change-box a frame open at the top and bottom and adapted to inclose the plates in the box, said frame being provided at one end with an aperture adapted to receive the plates to be exposed, an aperture in the side wall of the change-box adjacent to the aperture of said frame and provided with a closing device, an aperture at the other end of the change-box, and a slide guided in said last named aperture of the box adapted to successively move the plates with the exclusion of light, resilient means arranged at the back of the box to press the plates toward the plane of exposure, and outside means for displacing said resilient means.

3. In a photographic change-box a frame open at the top and bottom and at one end, said frame adapted to inclose the plates in the box, and to receive the same through said end opening, resilient means arranged at the back of the box to press the plates toward the plane of exposure, outside means for displacing said resilient means, apertures in two opposite side walls of the change-box, one forming a charging-aperture adjacent to the open end of said frame and provided with a closing-device and a slide guided in the aperture of the box opposite the charging aperture, said slide adapted to successively move the plates with the exclusion of light.

4. In a photographic change-box a frame open at the top and bottom and at one end, said frame adapted to laterally inclose the plates in the box and to receive same through said end opening, springs arranged at the back of the box adapted to press the plates toward the plane of exposure, a slide adapted to be moved over said springs in such a manner that the latter are pressed toward the back of the box, a charging aperture in the side wall of the change-box adjacent to the aperture of said frame and provided with a closing-device, a further aperture in the wall opposite said first named side wall of the change-box, and a slide guided in said last named aperture of the box, said slide adapted to successively move the plates with the exclusion of light.

In testimony whereof I have signed this specification in the presence of two subscribing witnesses.

PAUL KAEMMERER.

Witnesses:
WOLDEMAR HAUPT,
HENRY HASPER.